Patented Jan. 13, 1925.

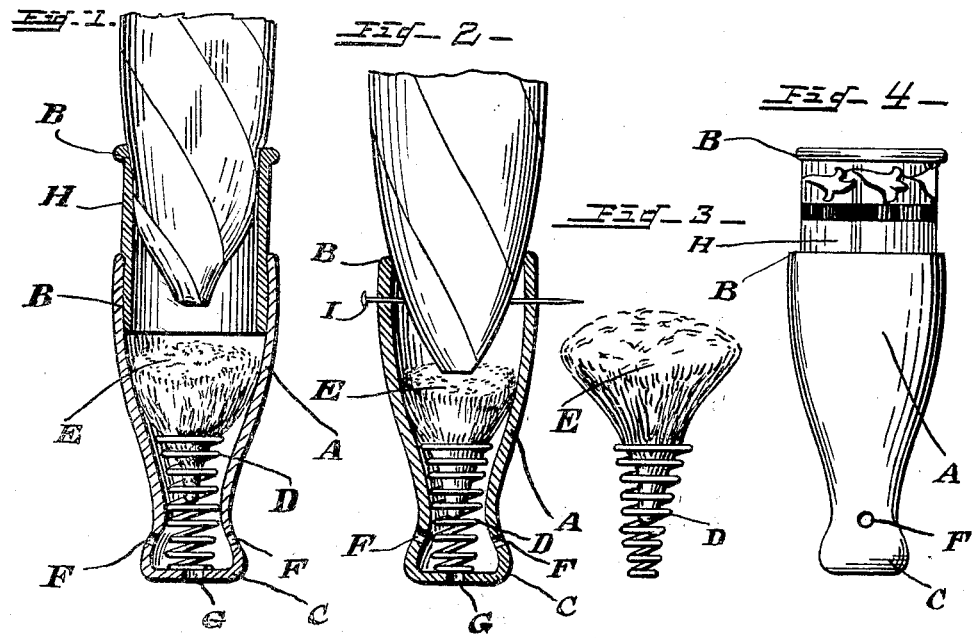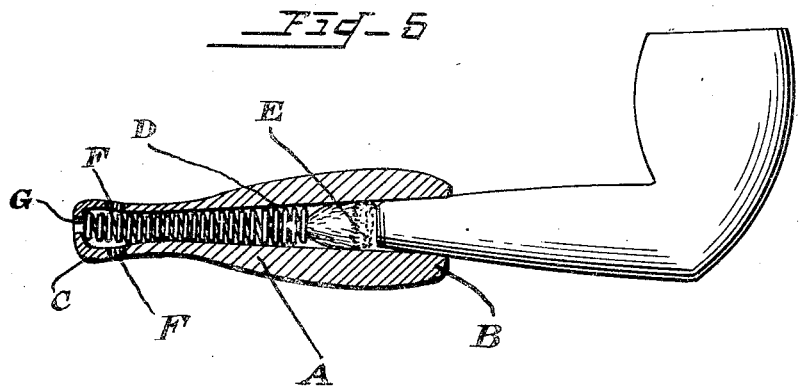

1,522,606

UNITED STATES PATENT OFFICE.

ERNEST A. VELDE, OF CEDAR RAPIDS, IOWA.

MOUTHPIECE FOR CIGARS OR PIPES.

Application filed February 3, 1922. Serial No. 533,992.

*To all whom it may concern:*

Be it known that I, ERNEST A. VELDE, a citizen of the United States, residing at Cedar Rapids, in the county of Linn and State of Iowa, have invented certain new and useful Improvements in Mouthpieces for Cigars or Pipes, of which the following is a specification.

My invention relates to that class of smoker's sanitary mouthpiece for cigar or pipe which is constructed of flexible material and has for its object, first, to provide a means for filtering the smoke, retaining the nicotine fluid and nonvaporous particles within the mouthpiece. Second, to provide means to prevent the restriction of the smoke passageway by pressure of the teeth of the smoker. Third, to provide such final smoke apertures as will not become constricted with use and will provide means for creating a cool and comfortable smoke.

I attain these objects by the mechanism illustrated in the accompanying drawings, in which, Figure 1 is a view of the main and auxiliary casings shown in central cut section with a composite component as filter and yieldable resisting element, a plurality of apertures as smoke passageways shown at one end with a cigar at the opposite end shown in elevation.

Fig. 2, is a view showing tubular casing in central cut section with cigar retaining pin and filtering component shown in elevation.

Fig. 3, is a view in elevation of the composite yieldable resisting element and filter component, showing the manner in which the filter is formed for a resilient fibrous absorbent material such as animal wool and showing the manner of attaching the same to a yieldable element of helical form.

Fig. 4, is a view in elevation of the device provided with an auxiliary cigar supporting member of ornamental non-yielding material.

Fig. 5, is a view in central cut section of the device, showing its adaptability for use with a pipe to obtain the same practical result as when used for smoking a cigar.

Referring to the drawing by letter, A is a tubular casing of semi-conical form with its largest end adapted to receive a cigar and its smaller end C, adapted to be held between the teeth of a smoker. D is a helical spring of semi-conical form. Its purpose is to resist the pressure of the teeth of the smoker upon the soft flexible tubular casing A, and to support and retain the filter E, which is formed of a resilient fibrous absorbent material such as animal wool, and adapted to be supported within the tubular casing A, in such a way as to filter the smoke and resist the pressure of the teeth of the smoker upon the casing A, at C. F, F are apertures for the passage of smoke and are auxiliary to the conventional aperture G. H is a removable section adapted to hold a cigar by friction and may be of flexible material as shown in Fig. 1 or of non-yieldable material as shown in Fig. 4. This auxiliary thimble section, as will be seen, extends beyond the cigar-holding outer end of the mouthpiece, and is preferably beaded at B, both for appearance and to facilitate its detachment. Its use gives the mouthpiece the desired variation in size at the receiving end, so as the better to fit the ends of cigars varying in size. I is a pin adapted to hold a cigar securely by passing through the flexible tubular casing A at *b*.

In operation it will be understood that the filter and yieldable resisting element E and D being placed within the component tubular casing A, and a cigar or pipe being held in the receiving end B, the smoker will place the mouthpiece end C, in a smokable position in his mouth whereupon the suction created by the smoker together with the pressure of the teeth upon the device at C, will casuse a resilient movement of the component E, D which it will be understood will prevent cohesion of resilient fibrous material forming the filter E, causing the residual accumulation to begin forming at the axial center of the filter E, and in accumulating build to the outer edge; thus the smoke in passing thru the filter E, will be purified until the filter E becomes entirely filled, when it will be understood the filter E may be quickly removed and replaced. It will be understood that the apertures F, F provide means for the free passage of smoke to the mouth of the smoker thereby producing a cool and enjoyable smoke with great ease, as it will be understood that thru the combined apertures F, F and C, a quick vacuum is created thru which smoke from a cigar or pipe is drawn through the filter E, and released quickly without burning the tongue, or discoloring the teeth of the smoker.

While I have illustrated and described the particular construction embodying my invention, I do not wish to be understood as intending to limit it thereto, as the same may be variously modified and altered without departing from the spirit of my invention.

Having described my invention, what I claim is,

1. A cigar-holder consisting of a mouthpiece having an enlarged head with a plurality of perforations, a spring mounted in said mouthpiece, and a filter secured to said spring.

2. A cigar-holder of the character described, consisting of a mouthpiece having an enlarged head provided with a plurality of perforations, a conical coil spring mounted in said mouthpiece, and a filter having a conical end fitting and held frictionally in said spring.

3. A cigar-holder comprising a flexible mouthpiece having an enlarged head with a plurality of perforations, a coil spring mounted inside the mouthpiece, a filter set in the outer end of the spring, and an extending removable thimble section inserted in the mouthpiece, and adapted to hold the end of a cigar.

In testimony whereof I affix my signature in presence of two witnesses.

ERNEST A. VELDE.

Witnesses:
J. ANDREW BROWER,
W. L. HARRISON.